(12) United States Patent
Takeda et al.

(10) Patent No.: US 11,791,879 B2
(45) Date of Patent: Oct. 17, 2023

(54) TERMINAL, BASE STATION, RADIO COMMUNICATION METHOD, AND SYSTEM FOR CONTROLLING SEMI-PERSISTENT CHANNEL STATE INFORMATION REPORTING

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Huiling Li, Beijing (CN); Xiaolin Hou, Beijing (CN); Chongning Na, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/762,071

(22) PCT Filed: Nov. 10, 2017

(86) PCT No.: PCT/JP2017/040640
§ 371 (c)(1),
(2) Date: May 6, 2020

(87) PCT Pub. No.: WO2019/092856
PCT Pub. Date: May 16, 2019

(65) Prior Publication Data
US 2020/0266866 A1    Aug. 20, 2020

(51) Int. Cl.
*H04B 7/06* (2006.01)
*H04W 24/10* (2009.01)
(Continued)

(52) U.S. Cl.
CPC .......... *H04B 7/0626* (2013.01); *H04W 24/10* (2013.01); *H04W 72/0446* (2013.01); *H04W 72/23* (2023.01); *H04W 72/53* (2023.01)

(58) Field of Classification Search
CPC .......................... H04B 7/0626; H04W 24/10; H04W 72/0446; H04W 72/0493; H04W 72/14; H04W 72/02; H04W 72/04; H04W 72/12
See application file for complete search history.

(56) References Cited

U.S. PATENT DOCUMENTS

| 2011/0249578 A1* | 10/2011 | Nayeb Nazar | ........ H04L 5/0053 370/252 |
| 2014/0056278 A1* | 2/2014 | Marinier | ............. H04W 72/044 370/330 |

(Continued)

FOREIGN PATENT DOCUMENTS

| WO | WO-2018053359 A1 * | 3/2018 | |
| WO | WO-2018126402 A1 * | 7/2018 | ........... H04L 1/0031 |

OTHER PUBLICATIONS

International Search Report issued in PCT/JP2017/040640 dated Jan. 9, 2018 (2 pages).
(Continued)

*Primary Examiner* — Ivan O Latorre
(74) *Attorney, Agent, or Firm* — Osha Bergman Watanabe & Burton LLP

(57) ABSTRACT

A user terminal according to one aspect of the present disclosure includes a transmitting section that transmits channel state information by use of a semi-persistently specified resource, and a control section that controls, in a case of transmitting data during a time duration in which the semi-persistently specified resource is included, transmission of the channel state information and the data. According to one aspect of the present disclosure, SP-CSI reporting can be appropriately controlled.

5 Claims, 10 Drawing Sheets

(51) Int. Cl.
*H04W 72/0446* (2023.01)
*H04W 72/23* (2023.01)
*H04W 72/53* (2023.01)

(56) References Cited

U.S. PATENT DOCUMENTS

| | | | | |
|---|---|---|---|---|
| 2015/0029964 | A1* | 1/2015 | Seo | H04L 5/001 370/329 |
| 2015/0043458 | A1* | 2/2015 | Seo | H04L 1/1861 370/329 |
| 2017/0156152 | A1 | 6/2017 | Nazar et al. | |
| 2018/0352582 | A1* | 12/2018 | Yi | H04W 72/1257 |
| 2019/0044639 | A1* | 2/2019 | Ouchi | H04W 72/23 |
| 2019/0174479 | A1* | 6/2019 | Yamazaki | H04W 72/085 |
| 2020/0022174 | A1* | 1/2020 | Karaki | H04W 72/1284 |
| 2020/0037314 | A1* | 1/2020 | Xiong | H04L 5/0091 |

OTHER PUBLICATIONS

Written Opinion of the International Searching Authority issued in PCT/JP2017/040640 dated Jan. 9, 2018 (4 pages).
Ericsson; "On semi-persistent CSI reporting on PUSCH"; 3GPP TSG-RAN WG1 #90bis, R1-1718442; Prague, Czech Republic; Oct. 9-13, 2017 (6 pages).
Ericsson; "On semi-persistent CSI reporting on PUSCH"; 3GPP TSG-RAN WG1 #90, R1-1714288; Prague, Czech Republic; Aug. 21-25, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 17931220.2, dated Jun. 10, 2021 (7 pages).
3GPP TSG-RAN WG1 #87; R1-1611984 "Discussion on NR CSI configuration" Intel Corporation; Reno, USA; Nov. 14-18, 2016 (5 pages).
3GPP TSG RAN WG1 Meeting #81; R1-152711 "Discussion on data overlapping and simultaneous transmission and reception for MTC UEs" LG Electronics; Fukuoka, Japan; May 25-29, 2015 (6 pages).
3GPP TSG-RAN WG2 Meeting #98; R2-1705118 "Grant-free resource configuration" Huawei, HiSilicon; Hangzhou, China; May 15-19, 2017 (4 pages).
Office Action issued in Japanese Application No. 2019-551838; dated Jan. 11, 2022 (6 pages).
Office Action issued in counterpart Chinese Patent Application No. 201780097869.4 dated Mar. 1, 2023 (13 pages).

* cited by examiner

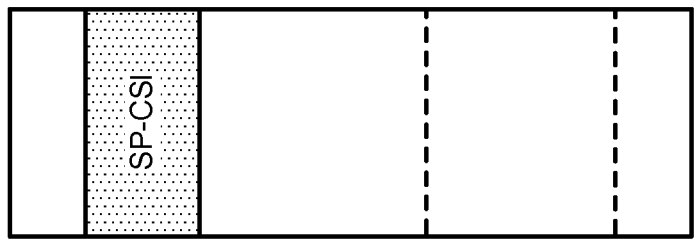
FIG. 4A
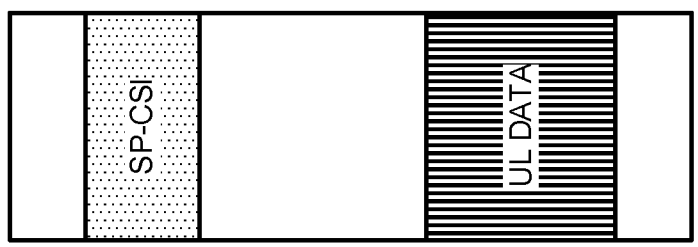
FIG. 4B
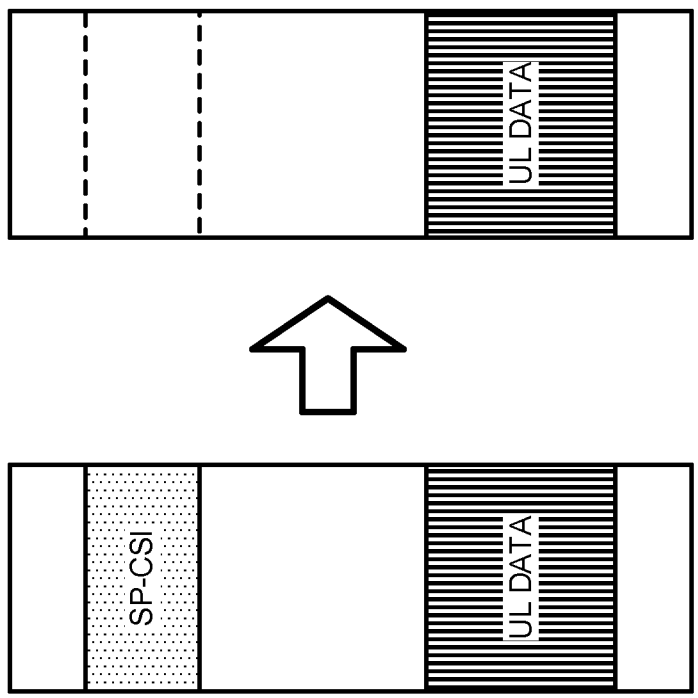

TERMINAL, BASE STATION, RADIO COMMUNICATION METHOD, AND SYSTEM FOR CONTROLLING SEMI-PERSISTENT CHANNEL STATE INFORMATION REPORTING

TECHNICAL FIELD

The present disclosure relates to a user terminal and a radio communication method in next-generation mobile communication systems.

BACKGROUND ART

In UMTS (Universal Mobile Telecommunications System) networks, the specifications of Long Term Evolution (LTE) have been drafted for the purpose of further increasing high speed data rates, providing lower latency, and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15 (or later versions)," and so on) are also under study.

In existing LTE systems (for example, LTE Rel. 8 to Rel. 13), a user terminal (UE: User Equipment) periodically and/or aperiodically transmits channel state information (CSI) to a base station. The UE transmits the CSI by use of an uplink control channel (PUCCH (Physical Uplink Control Channel)) and/or an uplink shared channel (PUSCH (Physical Uplink Shared Channel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), CSI reporting by use of a configuration different from those of the existing LTE systems (for example, LTE Rel. 13 or previous versions) is under study.

For example, SP-CSI (Semi-Persistent CSI) reporting in which a UE uses a semi-persistently (semi-permanently) specified resource to report CSI is under study.

A possible situation is that a timing of SP-CSI reporting contends with a timing of UL data transmission. However, how to deal with such a contention is not studied yet. Throughput reduction or the like may disadvantageously occur unless a scheme for appropriately dealing with such a contention is established.

In view of the above, an object of the present disclosure is to provide a user terminal and a radio communication method, which can appropriately control SP-CSI reporting.

Solution to Problem

A user terminal according to one aspect of the present disclosure includes a transmitting section that transmits channel state information by use of a semi-persistently specified resource, and a control section that controls, in a case of transmitting data during a time duration in which the semi-persistently specified resource is included, transmission of the channel state information and the data.

Advantageous Effects of Invention

According to one aspect of the present disclosure, SP-CSI reporting can be appropriately controlled.

BRIEF DESCRIPTION OF DRAWINGS

FIGS. 4A and 4B are diagrams to show examples of contention avoidance control on SP-CSI reporting according to a fourth embodiment;

DESCRIPTION OF EMBODIMENTS

Figure 1B:
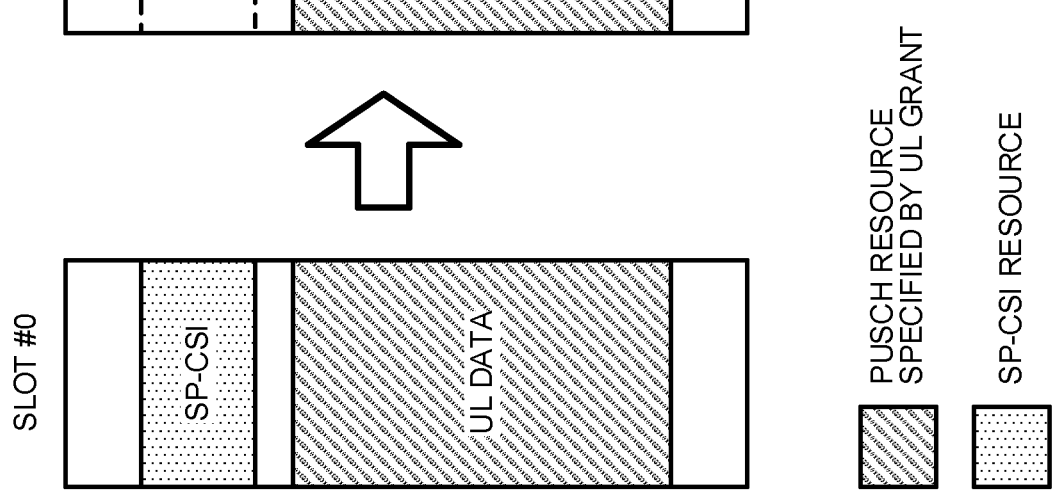
FIGS. 1A and 1B are diagrams to show examples of contention avoidance control on SP-CSI reporting according to a first embodiment.

In the existing LTE systems (Rel. 10 to Rel. 13), a reference signal for measuring a channel state in a downlink is defined. The reference signal for channel state measurement is also referred to as a "CRS (Cell-specific Reference Signal)" and a "CSI-RS (Channel State Information-Reference Signal)," and is a reference signal used to measure channel state information (CSI) such as a CQI (Channel Quality Indicator), a PMI (Precoding Matrix Indicator), and a RI (Rank Indicator).

A UE feeds back a result measured based on the reference signal for channel state measurement as the CSI to a base station at a certain timing. As a method for feeding back the CSI, periodic CSI (P-CSI) reporting and aperiodic CSI (A-CSI) reporting are defined.

The UE, in a case of P-CSI reporting, feeds back P-CSI every certain period (for example, 5-subframe period, 10-subframe period, and the like). The UE uses an uplink control channel in a certain cell (for example, a primary cell (PCell), a PUCCH cell, a primary secondary cell (PSCell)) to transmit the P-CSI.

In a case of no uplink data (for example, PUSCH) transmission at a certain timing (a certain subframe) of the P-CSI reporting, the UE transmits the P-CSI by use of an uplink control channel (for example, PUCCH). On the other hand, in a case of performing an uplink data transmission at the certain timing, the UE can use an uplink shared channel to transmit the P-CSI.

In a case of A-CSI reporting, the UE transmits A-CSI in response to a CSI trigger (CSI request) from the base station. For example, the UE performs the A-CSI reporting a certain timing (for example, 4 subframes) after receiving the CSI trigger.

The CSI trigger reported from the base station is included in downlink control information (for example, DCI format 0/4) for an uplink scheduling grant (UL grant) transmitted by use of a downlink control channel. Note that the UL grant may be DCI for scheduling UL data (for example, PUSCH) transmission and/or UL sounding (measurement) signal transmission.

The UE uses an uplink shared channel specified by the UL grant to transmit the A-CSI, in accordance with the trigger included in the downlink control information for the UL grant. In a case of adopting CA, the UE can receive a UL grant (including an A-CSI trigger) for a cell on a downlink control channel for another cell.

For future radio communication systems (for example, NR), a study is underway to utilize CSI reporting by use of a configuration different from those of the existing LTE systems (for, example, LTE Rel. 13 or previous versions).

For example, SP-CSI (Semi-Persistent CSI) reporting in which a UE uses a semi-persistently (semi-permanently) specified resource to report CSI is under study. Once a resource for SP-CSI reporting (which may also be referred to as a "SP-CSI resource") is specified, the UE can periodically utilize a resource based on the same assumption until another SP-CSI resource is specified.

The SP-CSI resource may be a resource configured through higher layer signaling, or a resource specified by an activation signal for the SP-CSI reporting.

Here, for example, the higher layer signaling may be any one or a combination of RRC (Radio Resource Control) signaling, MAC (Medium Access Control) signaling, broadcast information, and the like. For example, the MAC signaling may use MAC control elements (MAC CEs), MAC PDUs (Protocol Data Units), and the like. For example, the broadcast information may be master information blocks (MIBs), system information blocks (SIBs), minimum system information (RMSI (Remaining Minimum System Information)), and the like.

In a case that the UE receives a certain activation signal, the UE can periodically perform CSI measurement using a certain reference signal (which may also be referred to as, for example, an "SP-CSI-RS") and/or the SP-CSI reporting using the SP-CSI resource, for example. In a case that the UE receives a certain deactivation signal or a certain timer expires, the UE stops the SP-CSI measurement and/or reporting.

The activation/deactivation signal for the SP-CSI reporting may be notified through, for example, MAC signaling (for example, MAC CE), or physical layer signaling (for example, downlink control information (DCI).

Note that the SP-CSI reporting may be transmitted by use of either of or both the PUCCH and the PUSCH. Which one is to be used for the transmission may be configured through RRC signaling, specified by MAC CEs, or reported through DCI. In a case that the SP-CSI reporting is configured, through RRC signaling, so that the SP-CSI reporting can be transmitted on both the PUCCH and the PUSCH, which of the PUCCH and the PUSCH is to be used may be selected according to at least one of a type of DCI (for example, DCI for activating the SP-CSI reporting), a value of a radio network temporary identifier (RNTI) masking a CRC of the DCI, a type of a search space in which the DCI is detected, a resource for the search space, and the like.

For NR, in order to attain low latency communication, a study is underway, besides the UL grant-based transmission for transmitting UL data based on a UL grant, to adopt the UL grant-free transmission for transmitting UL data with no UL grant. The UL grant-free transmission may be referred to as a "UL transmission without UL grant", or may be defined as one type of UL SPS (Semi-Persistent Scheduling).

In the UL grant-based transmission, the radio base station (which may also be referred to as, for example, a "BS (Base Station)," "transmission/reception point (TRP)," "eNB (eNodeB)," "gNB (NR NodeB)," and the like) transmits a downlink control channel (UL grant) indicating allocation of UL data (PUSCH (Physical Uplink Shared Channel) to the UE, and the UE transmits the UL data in accordance with a UL grant.

On the other hand, in the UL grant-free transmission, the UE transmits the UL data without receiving a UL grant for scheduling the data. Note that, the UL grant-free transmission means no direct UL grant via the PDCCH for a UL data transmission, and for example, RRC signaling for configuring the UL grant-free transmission, or L1 signaling for activating the UL grant-free transmission can be also adopted. Hereinafter, UL grant-free is also referred to as merely "ULGF," "GF PUSCH," "GF," or the like.

Similarly to the SPS in the existing LTE, the UE can determine whether to perform transmission by use of a resource for GF transmission (which may also be referred to as a "GF resource," or the like), based on a certain activation/deactivation signal. Even in a case that the GF transmission is activated, the UE may skip the GF transmission if no data is in a transmission buffer.

The UE may transmit an acknowledgement (ACK) in response to reception of a certain activation/deactivation signal. The ACK may be transmitted by use of MAC CEs, for example.

Some types of control of GF transmission (type 1, type 2, and so on) are under study. For example, for type 1, parameters used for a GF transmission (which may also be referred to as "GF transmission parameters," "GF parameters," and the like) are configured for the UE through only RRC signaling. The GF parameters may include information specifying a GF resource, for example.

For type 2, some of the GF parameters (for example, a waveform, a period, and the like) are configured for the UE through RRC signaling. In a case of type 2, other parameters may be specified by an activation signal, for example. The activation signal may be a PDCCH with CRC masked (scrambled) by an RNTI for the activation signal configured through RRC signaling, for example.

As described above, in NR, it is studied that a UE performs SP-CSI reporting. A possible situation is that a timing of SP-CSI reporting contends with a timing of the UL data transmission (data transmission based on at least one of the UL grant, the ULGF, and the SPS). However, how to deal with such a contention is not studied yet. Throughput reduction or the like may disadvantageously occur unless a scheme for appropriately dealing with such a contention is established.

In view of the above, the inventors of the present invention came up with the idea of a method for appropriately dealing with a case that SP-CSI reporting contends with data transmission.

Hereinafter, embodiments according to the present disclosure will be described in detail with reference to the drawings. Radio communication methods according to the embodiments may be employed independently or may be employed in combination.

Here, "contention" refers to that a plurality of signals and/or channels are transmitted (or scheduled for transmission) in the same time resource (for example, in the same slot), but is not limited thereto. For example, "contention" may refer to that a plurality of signal and/or channels are transmitted (or scheduled for transmission) in a radio resource which at least a time resource overlap (for example, overlapping time and frequency resources).

Note that a unit of time resource is not limited to a slot, and may be interpreted as a "mini-slot," a "symbol," a "subframe," and the like.

The "ULGF" described herein may be interpreted as "ULGF and/or SPS."

(Radio Communication Method)

First Embodiment

In a first embodiment, the UE assumes that a contention does not occur between SP-CSI reporting and a dynamic scheduling (UL grant)-based UL data transmission.

In this case, the base station preferably schedules the SP-CSI reporting and/or UL data to avoid the contention.

Note that even in a case that the above contention occurs (for example, even in a case that the UE recognizes that the timing of the SP-CSI reporting and the transmission timing based on a UL grant overlap), the UE may communicate (piggyback) the SP-CSI reporting using the PUSCH scheduled by way of the UL grant, or may transmit the UL data and the SP-CSI reporting by use of a SP-CSI resource.

For example, in the case of communicating (piggybacking) the SP-CSI reporting by using the PUSCH scheduled by way of the UL grant, the UE maps CSI information that is to be reported by way of the SP-CSI to some of resource elements (REs) of the scheduled PUSCH. In this case, the UE may apply rate matching or puncturing to the UL data to be transmitted on the PUSCH.

Figure 1A:
Figure 1A:
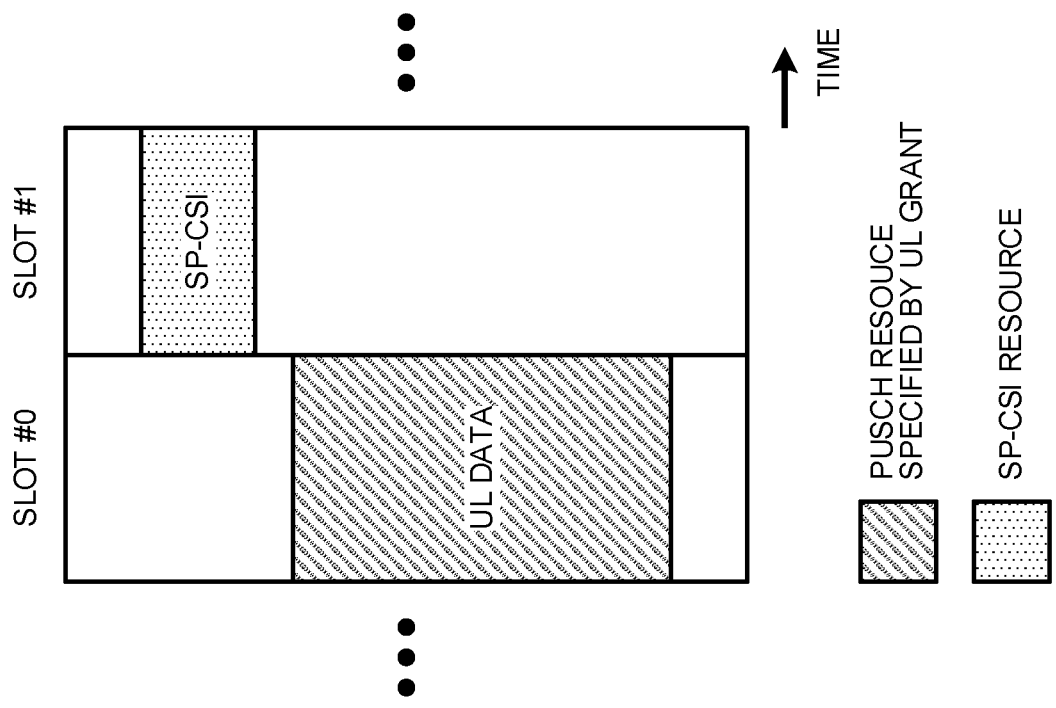

FIGS. 1A and 1B are diagrams to show examples of contention avoidance control on the SP-CSI reporting according to the first embodiment. FIG. 1A shows an example in which the UL data transmission and the SP-CSI reporting are scheduled in time resources different from each other (slots #0 and #1). In this case, no contention occurs.

FIG. 1B shows an example in which a UL data transmission and SP-CSI reporting are scheduled in the same time resource (slot #0). In this case, if the UE uses a resource specified by a UL grant and a SP-CSI resource to perform respective transmissions, a contention occurs (on the left side in FIG. 1B). On the other hand, according to the control in the first embodiment, the UE uses the PUSCH resource specified by the UL grant to transmit both the UL data and the SP-CSI, and thus, a contention can be avoided (on the right side in FIG. 1B).

According to the first embodiment described above, the contention between SP-CSI reporting and a UL grant-based UL data transmission can be preferably avoided.

Second Embodiment

In a second embodiment, in the case that a contention occurs between SP-CSI reporting and a ULGF-based UL data transmission, the UE may communicate (piggyback) the SP-CSI reporting by using a PUSCH of a ULGF resource. In other cases (for example, a case that there is no ULGF-based UL data transmission, or a case that the ULGF transmission is skipped), the UE may use the SP-CSI resource to transmit the SP-CSI reporting.

For example, in the case of communicating (piggybacking) the SP-CSI reporting by using the PUSCH of the ULGF resource, the UE maps the CSI information that is to be reported by way of SP-CSI to some of the resource elements (REs) of the scheduled PUSCH. In this case, the UE may apply rate matching or puncturing to the UL data to be transmitted on the PUSCH. In a case of the rate matching, quality deterioration in the UL data due to the piggybacking can be suppressed. In a case of the puncturing, when the base station performs a receiving process on the PUSCH, the same process can be performed regardless of whether or not CSI is piggybacked, and thus, a process load on the base station can be decreased.

In the second embodiment, in the case that the UE uses a PUSCH of the ULGF resource to communicate SP-CSI reporting, the UE skips (does not transmit) a SP-CSI resource that is to be contended.

Figure 2:
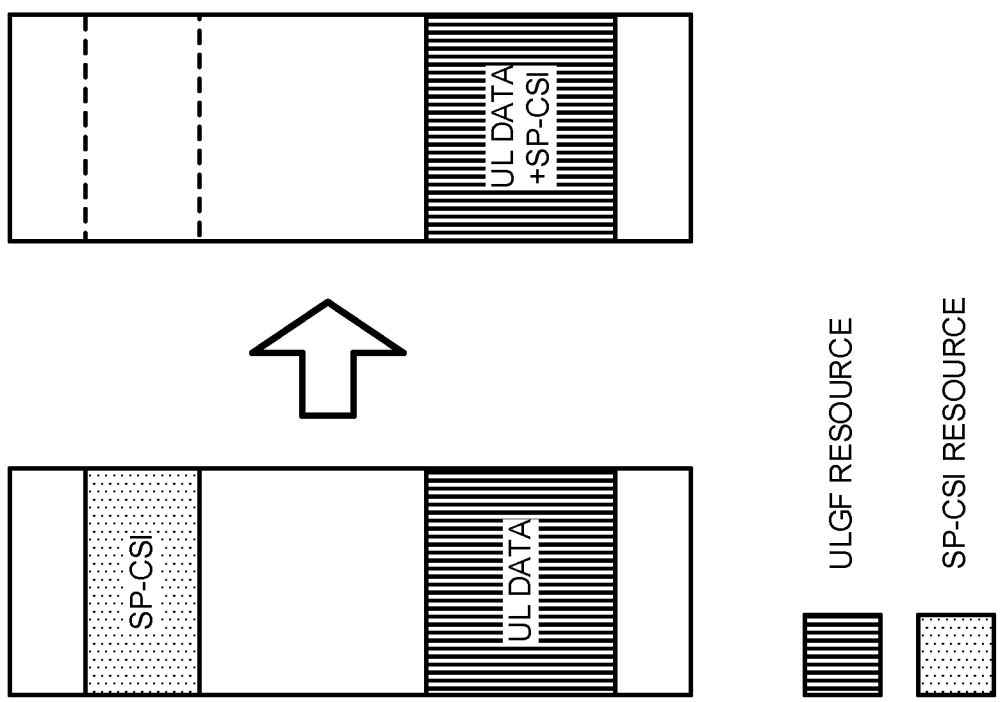
FIG. 2 is a diagram to show an example of contention avoidance control on SP-CSI reporting according to a second embodiment.

FIG. 2 is a diagram to show an example of contention avoidance control on SP-CSI reporting according to the second embodiment. FIG. 2 shows an example in which a UL data transmission in a ULGF resource and SP-CSI reporting are scheduled in the same time resource. In this case, if the UE uses the ULGF resource and an SP-CSI resource to perform respective transmissions, a contention occurs (on the left side in FIG. 2). On the other hand, according to the control in the second embodiment, the UE uses the ULGF resource to transmit both UL data and SP-CSI, and thus, a contention can be avoided (on the right side in FIG. 2).

In the second embodiment, the base station needs to perform blind decoding twice to determine whether or not a skip of the ULGF transmission has occurred and further detect SP-CSI reporting. For example, if the base station performs a receiving process (decoding or the like) on the ULGF resource, and determines that the ULGF transmission is skipped, the base station may perform a receiving process on the SP-CSI resource to receive the SP-CSI reporting.

According to the second embodiment described above, a contention between SP-CSI reporting and a ULGF-based UL data transmission can be preferably avoided.

Third Embodiment

In a third embodiment, in the case that a contention occurs between SP-CSI reporting and a ULGF-based UL data transmission, the UE may use a SP-CSI resource to transmit UL data. In other words, the UE always uses a SP-CSI resource to transmit SP-CSI reporting.

In the third embodiment, in the case that the UE uses the SP-CSI resource to transmit the UL data, the UE skips a ULGF resource that is to be contended.

Figure 3:
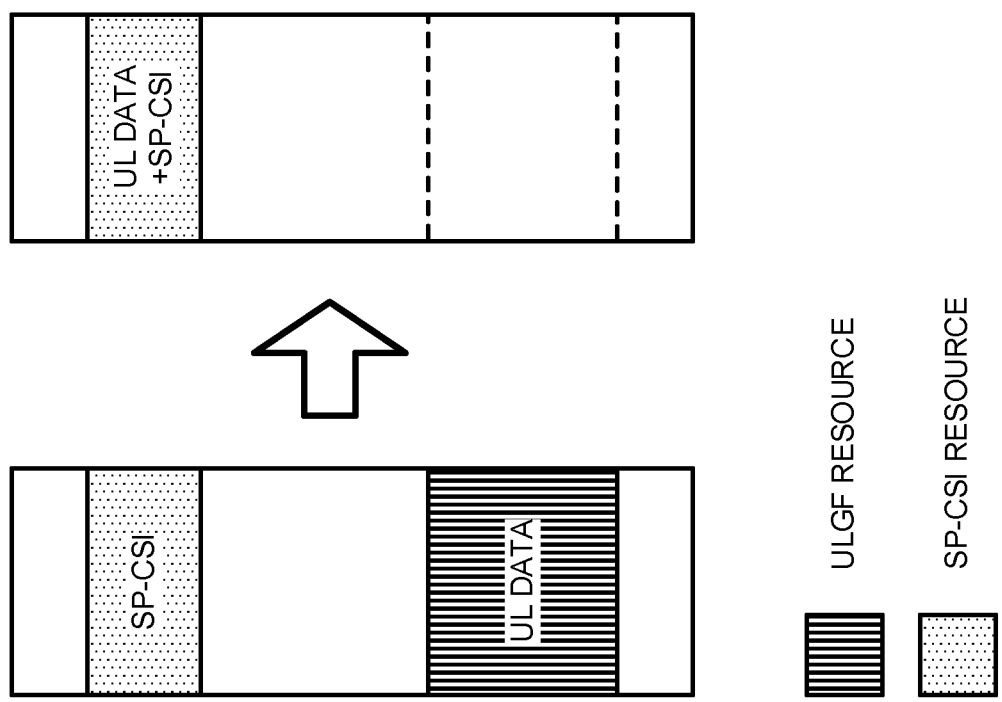
FIG. 3 is a diagram to show an example of contention avoidance control on SP-CSI reporting according to a third embodiment.

FIG. 3 is a diagram to show an example of contention avoidance control on SP-CSI reporting according to the third embodiment. FIG. 3 shows an example in which a UL data transmission in a ULGF resource and SP-CSI reporting are scheduled in the same time resource. In this case, if the UE uses the ULGF resource and an SP-CSI resource to perform respective transmissions, a contention occurs (on the left side in FIG. 3). On the other hand, according to the control in the third embodiment, the UE uses the SP-CSI resource to transmit both the UL data and the SP-CSI, and thus, a contention can be avoided (on the right side in FIG. 3).

In the third embodiment, the base station needs to determine whether only the SP-CSI reporting is in the SP-CSI resource, or both the SP-CSI reporting and the UL data are in the SP-CSI resource. The base station may make the above determination by, for example, performing cyclic redundancy check (CRC) check on a signal transmitted in the SP-CSI resource.

For example, in the case of transmitting the SP-CSI reporting only, the UE may uses a radio network temporary identifier (RNTI) for the SP-CSI (which may also be referred to as an "SP-CSI RNTI" and an "SP-CSI C (Cell)-RNTI," for example) to scramble a CRC added to the SP-CSI. In other cases, the UE may use a RNTI for SPS (for example, SPS (C-)RNTI) and/or a RNTI for ULGF (for example, ULGF (C-)RNTI) to scramble CRCs added to the SP-CSI reporting and the UL data.

According to the third embodiment described above, a contention between SP-CSI reporting and a ULGF-based UL data transmission can be preferably avoided. Using no ULGF resource can suppress a contention with a ULGF transmission by another UE.

Note that the second embodiment and the third embodiment may be used differently based on whether or not skip of SP-CSI reporting is supported. For example, in a case of supporting skip of SP-CSI reporting, the UE may perform the control based on the second embodiment, and in other cases, the UE may perform the control based on the third embodiment.

Here, the "case of supporting skip of SP-CSI reporting" may be, for example, a case that the UE has a UE capability capable of skipping the SP-CSI reporting, or a case that the UE is notified, by the base station, of information for allowing (or not limiting) skip of SP-CSI reporting through higher layer signaling or the like.

Fourth Embodiment

In a fourth embodiment, in the case that a contention occurs between SP-CSI reporting and a ULGF-based UL data transmission, the UE may transmit either of the SP-CSI reporting and UL data.

For example, in the case of an occurrence of the above contention, the UE may report SP-CSI on a priority basis, and drop the ULGF transmission. Alternatively, in the case of an occurrence of the above contention, the UE may transmit a ULGF on a priority basis, and drop the SP-CSI reporting. In the case of prioritizing the SP-CSI, MIMO (Multi-Input Multi-Output) control can be controlled preferably and with no delay. In the case of prioritizing the ULGF, a low latency service can be controlled with no delay.

The UE may determine to prioritize which of the SP-CSI reporting and the ULGF transmission, based on a certain condition. For example, in a case that a channel quality (for example, CQI value) that is to be transmitted through the SP-CSI reporting is a certain threshold or less, the UE may determine to drop the SP-CSI reporting. In a case that the UL data (traffic) transmitted with the ULGF has higher priority, the UE may determine to drop the SP-CSI reporting.

The UE may be notified, by the base station, of information about the above certain condition (which may also be referred to as "information about priority for SP-CSI reporting and a ULGF transmission," or the like) through higher layer signaling, physical layer signaling, or a combination of these. For example, the information about the certain condition may include at least one of an indication of prioritizing the SP-CSI reporting, an indication of prioritizing the ULGF transmission, the above certain threshold, and the like.

FIGS. 4A and 4B are diagrams to show examples of contention avoidance control on SP-CSI reporting according to the fourth embodiment. FIGS. 4A and 4B show examples in which a UL data transmission in a ULGF resource and SP-CSI reporting are scheduled in the same time resource. In this case, if the UE uses the ULGF resource and SP-CSI resource to perform respective transmissions, a contention occurs (on the left side in FIG. 4A and on the left side in FIG. 4B). On the other hand, according to the control in the fourth embodiment, the UE uses the ULGF resource to transmit UL data, or uses the SP-CSI resource to transmit SP-CSI, and thus, a contention can be avoided (on the right side in FIG. 4A and on the right side in FIG. 4B).

According to the fourth embodiment described above, a contention between SP-CSI reporting and a ULGF-based UL data transmission can be preferably avoided.

(Variations)

Note that the base station may notify the UE of information about whether to perform the control according to any of the first to fourth embodiments through higher layer signaling, physical layer signaling, or a combination of these. The UE may determine the control for avoiding a contention between SP-CSI reporting and UL data transmission, based on that information.

(Radio Communication System)

Hereinafter, a structure of a radio communication system according to one embodiment of the present disclosure will be described. In this radio communication system, any or a combination of the radio communication methods according to the embodiments of the present disclosure described above may be used for communication.

Figure 5:
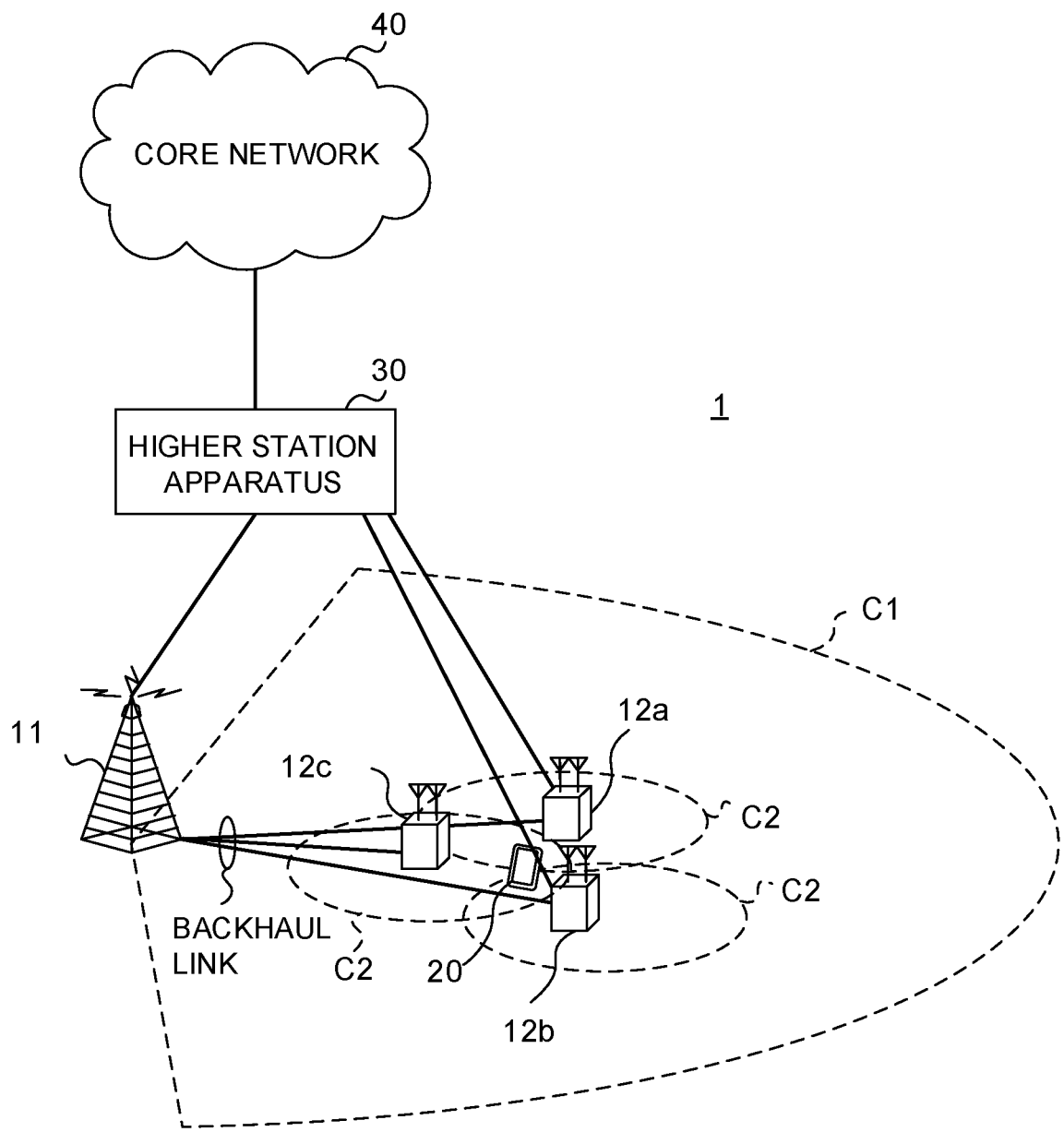
FIG. 5 is a diagram to show an example of a schematic configuration of a radio communication system according to one embodiment.

FIG. 5 is a diagram to show an example of a schematic configuration of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 6:
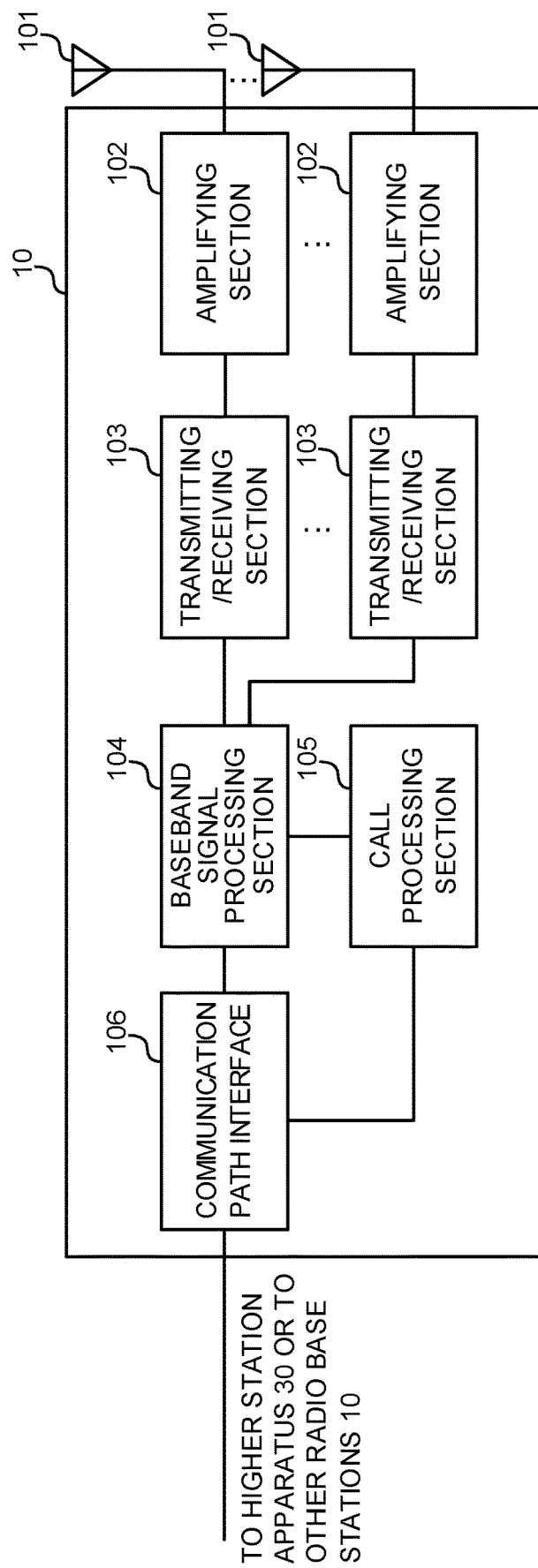
FIG. 6 is a diagram to show an example of an overall configuration of a radio base station according to one embodiment.

FIG. 6 is a diagram to show an example of an overall configuration of the radio base station according to one embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 may receive the channel state information (SP-CSI) transmitted from the user terminal 20 by use of the semi-persistently specified resource. The transmitting/receiving sections 103 may transmit transmission indications (UL grant) to the user terminal 20.

The transmitting/receiving sections 103 may transmit the information about the priority for the SP-CSI reporting and the ULGF transmission, or the like to the user terminal 20.

Figure 7:
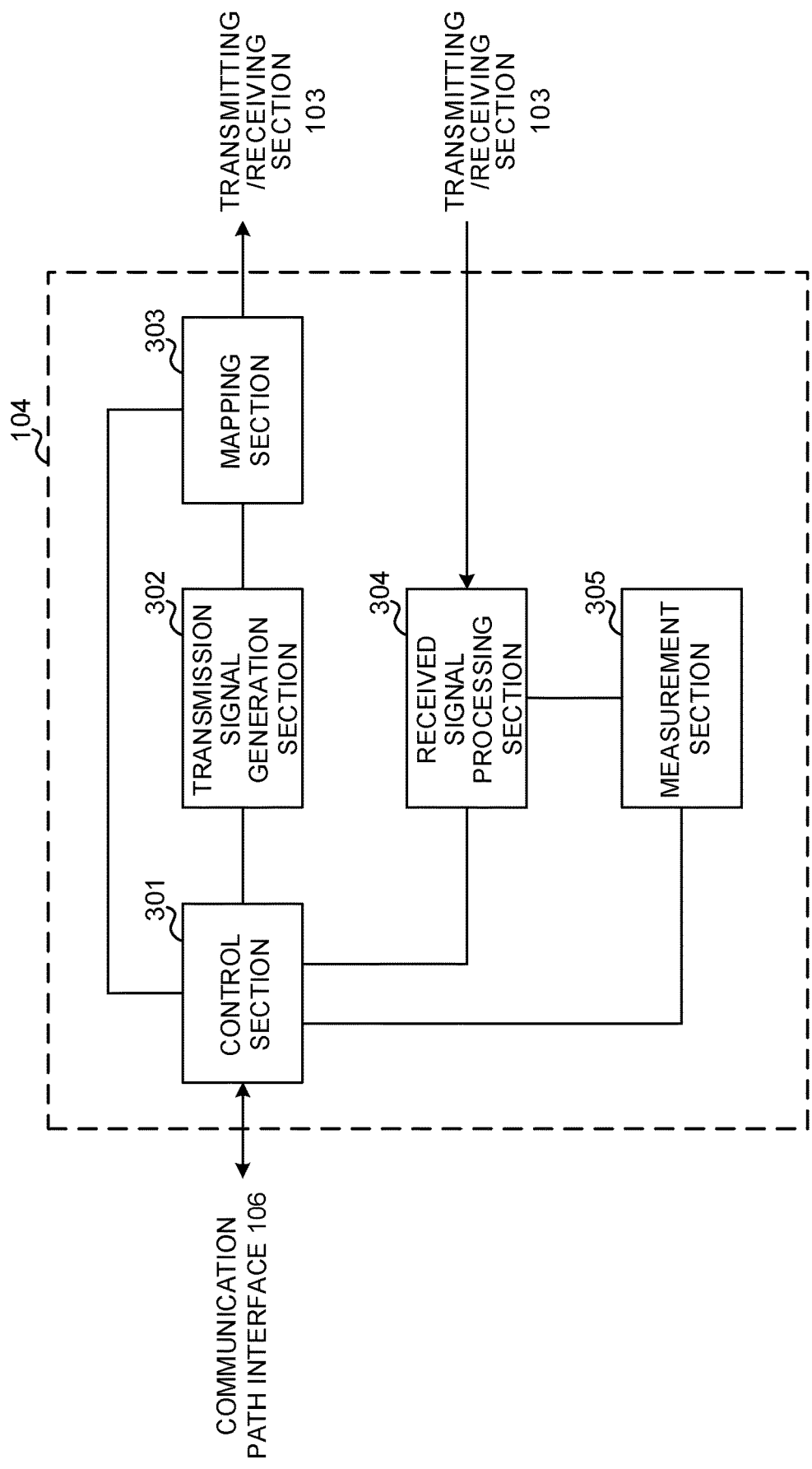
FIG. 7 is a diagram to show an example of a functional configuration of the radio base station according to one embodiment.

FIG. 7 is a diagram to show an example of a functional configuration of the radio base station according to one embodiment of the present disclosure. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource allocation) of system information, a downlink data signal (for example, a signal transmitted on the PDSCH), a downlink control signal (for example, a signal transmitted on the PDCCH and/or the EPDCCH. acknowledgment information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls scheduling of an uplink data signal (for example, a signal transmitted on the PUSCH), an uplink control signal (for example, a signal transmitted on the PUCCH and/or the PUSCH, acknowledgment information, and so on), a random access preamble (for example, a signal transmitted on the PRACH), an uplink reference signal, and so on.

The control section 301 may control the receiving process (for example, decoding and the like) in a time duration in which the semi-persistently specified resource (SP-CSI resource) is included. For example, the control section 301 may determine to decode which resource among the SP-CSI resource, the resource specified by the UL grant, the ULGF resource, the SPS resource, and the like during the time duration.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

(User Terminal)

Figure 8:
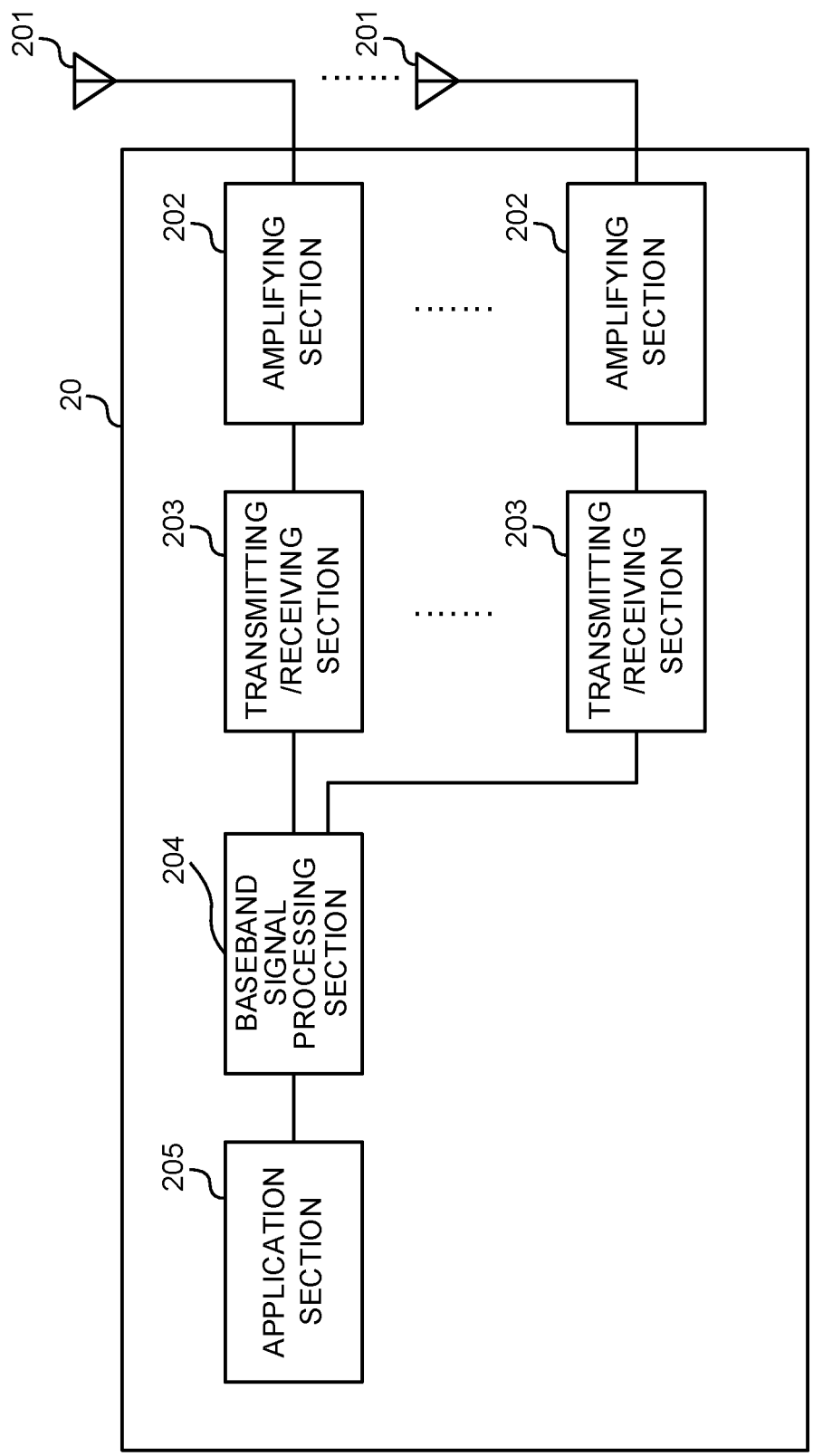
FIG. 8 is a diagram to show an example of an overall configuration of a user terminal according to one embodiment.

FIG. 8 is a diagram to show an example of an overall configuration of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may transmit the channel state information (SP-CSI) by use of the semi-persistently specified resource. The transmitting/receiving sections 203 may receive transmission indications (UL grant) from the radio base station 10.

The transmitting/receiving sections 203 may receive the information about the priority for the SP-CSI reporting and the ULGF transmission, or the like from the radio base station 10.

Figure 9:
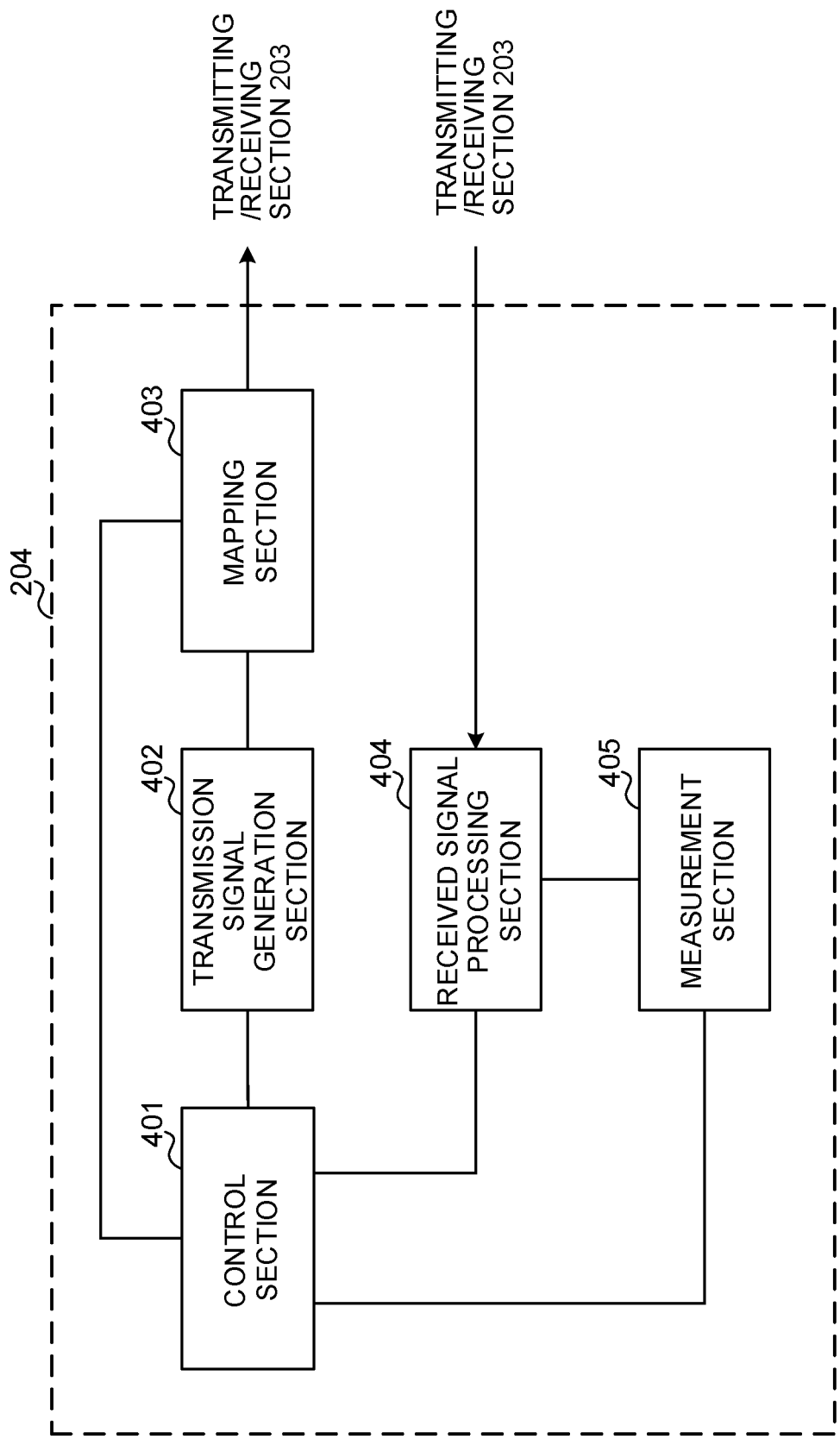
FIG. 9 is a diagram to show an example of a functional configuration of the user terminal according to one embodiment.

FIG. 9 is a diagram to show an example of a functional configuration of the user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals in the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may control, in a case of transmitting data during a time duration in which the semi-persistently specified resource (SP-CSI resource) is included, transmission of the SP-CSI and/or the data. For example, in a case that the SP-CSI reporting contends with the data transmission, the control section 401 may determine which of the SP-CSI and the data is transmitted (whether one or both of them is transmitted), or may determine which resource is used for transmission.

For example, in a case that the data transmission is based on a transmission indication for the data (for example, in a case based on the UL grant received from the radio base station 10), the control section 401 may perform control that uses the resource specified by the transmission indication to transmit the SP-CSI and the data.

In a case that the data transmission is not based on a transmission indication for the data (for example, in a case not based on the UL grant received from the radio base station 10, and in which the ULGF transmission or the SPS transmission is performed), the control section 401 may perform control that uses a resource for the data transmission not based on the transmission indication (for example, the ULGF resource, the SPS resource, and the like) to transmit the SP-CSI and the data.

In the case that the data transmission is not based on a transmission indication for the data, the control section 401 may perform control that uses the SP-CSI resource to transmit the SP-CSI and the data.

In the case that the data transmission is not based on a transmission indication for the data, the control section 401 may perform control to drop any one of the SP-CSI and the data. In this case, the control section 401 may perform control to transmit one of the SP-CSI and the data that is not dropped by using a resource for the one that is not dropped.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 10:
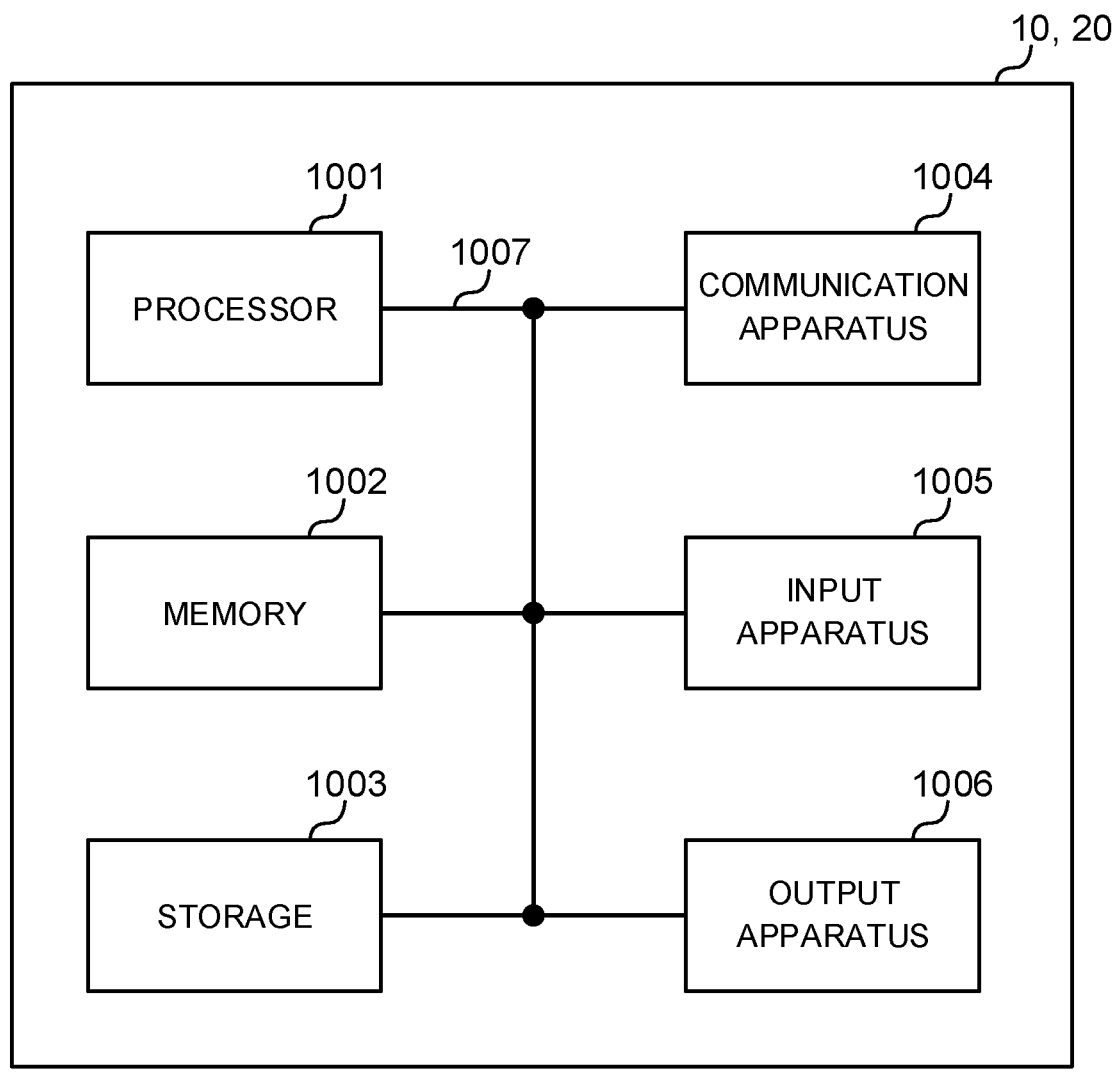
FIG. 10 is a diagram to show an example of a hardware configuration of the radio base station and the user terminal according to one embodiment.

For example, a radio base station, a user terminal, and so on according to one embodiment of the present disclosure may function as a computer that executes the processes of the radio communication method of the present disclosure. FIG. 10 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to one embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter time period than 1 ms (for example, 1 to 13 symbols), or may be a longer time period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table.

The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

The invention claimed is:

1. A terminal comprising:
    a transmitter that performs semi-persistent channel state information (CSI) reporting on a physical uplink control channel (PUCCH) at a timing configured by higher layer signaling; and
    a processor that performs, when a transmission of a physical uplink shared channel (PUSCH) without uplink grant and a transmission of the PUCCH are overlapped and the PUSCH has a first priority information that is higher than a second priority information of the PUCCH on which the semi-persistent CSI reporting is performed, a control not to transmit the PUCCH,
    wherein the timing of the semi-persistent CSI reporting is based on a subcarrier spacing.

2. The terminal according to claim 1, wherein the terminal comprises a receiver that receives the first priority information of the PUSCH.

3. A radio communication method for a terminal, comprising:
    performing semi-persistent channel state information (CSI) reporting on a physical uplink control channel (PUCCH) at a timing configured by higher layer signaling; and
    performing, when a transmission of a physical uplink shared channel (PUSCH) without uplink grant and a transmission of the PUCCH are overlapped and the PUSCH has a first priority information that is higher than a second priority information of the PUCCH on which the semi-persistent CSI reporting is performed, a control not to transmit the PUCCH,
    wherein the timing of the semi-persistent CSI reporting is based on a subcarrier spacing.

4. A base station comprising:
    a receiver that receives semi-persistent channel state information (CSI) reporting performed on a physical uplink control channel (PUCCH) at a timing configured by higher layer signaling; and
    a transmitter that transmits a first priority information and a second priority information, which are set so that the PUCCH on which the semi-persistent CSI reporting is performed is not transmitted when a transmission of a physical uplink shared channel (PUSCH) without uplink grant and a transmission of the PUCCH are overlapped,
    wherein the timing of the semi-persistent CSI reporting is based on a subcarrier spacing.

5. A system comprising a terminal and a base station, wherein
    the terminal comprises:
        a transmitter of the terminal that performs semi-persistent channel state information (CSI) reporting on a physical uplink control channel (PUCCH) at a timing configured by higher layer signaling; and
        a processor that performs, when a transmission of a physical uplink shared channel (PUSCH) without uplink grant and a transmission of the PUCCH are overlapped and the PUSCH has a first priority information that is higher than a second priority information of the PUCCH on which the semi-persistent CSI reporting is performed, a control not to transmit the PUCCH, and the base station comprises:
- a receiver that receives the semi-persistent CSI; and
- a transmitter of the base station that transmits the first priority information and the second priority information, which are set so that the PUCCH is not transmitted when the transmission of the PUSCH without uplink grant and the transmission of the PUCCH are overlapped, wherein the timing of the semi-persistent CSI reporting is based on a subcarrier spacing.

* * * * *